Aug. 28, 1928.

H. A. HOUSTON

ELECTRIC LOCOMOTIVE

Filed Oct. 3, 1925

1,682,517

WITNESSES:
R. S. Harrison
M. B. Jaspert

INVENTOR
Harold A. Houston
BY
Wesley G. Carr
ATTORNEY

Patented Aug. 28, 1928.

1,682,517

UNITED STATES PATENT OFFICE.

HAROLD A. HOUSTON, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC LOCOMOTIVE.

Application filed October 3, 1925. Serial No. 60,290.

My invention relates to railway vehicles, and more particularly to the supporting frame structure of electric railway vehicles, such as locomotives.

It is among the objects of my invention to provide an articulated frame structure for electric railway vehicles which shall materially improve their operating performance on curves, and which shall prevent the stressing of the frame structure when the vehicle enters or leaves a curve leading from or to a tangent track.

Another object of my invention is to provide a railway vehicle structure which shall eliminate, to a great extent, the wear of the wheel flanges that has been caused by excessive steering actions on vehicles having a relatively long wheel base.

It has been customary to either articulate the cab portion of the locomotive or to provide a sufficient number of supporting trucks movable relative to the cab, to prevent chording of the vehicle on the curves and to eliminate, as much as possible, the stressing of the vehicle frame under such conditions.

In my present invention, I obviate the necessity of articulating the vehicle body by utilizing an articulated sub-frame or vehicle deck by which the cab is supported on the truck members.

In practicing my invention, I employ a rigid cab construction, comprising a unitary body having a main supporting frame, which embodies a pair of cooperating frame members having their confronting ends joined, at the center of the vehicle, to permit pivotal or angular movement thereof. The extended ends of the frame members are adapted to cooperatively engage the frame portions of the cab, for the purpose of maintaining a fixed relation of the frame to the cab structure.

The joint of the cooperating frame portions, which function as the main frame or equipment deck, is formed to constitute a center pin for engagement with a truck, and other center pins are provided, at the extended ends of the frame, for engaging truck members in longitudinally spaced relation to the center truck.

Figure 1:
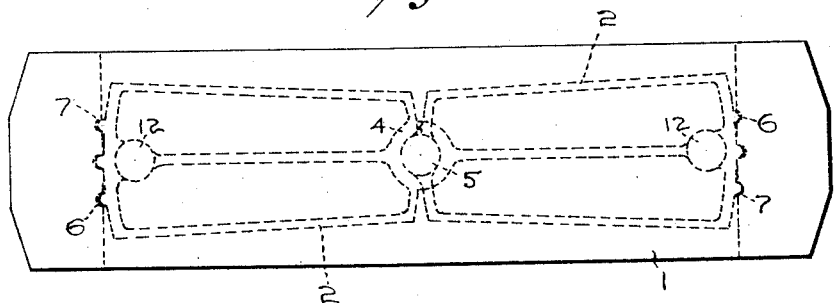
Figure 2:
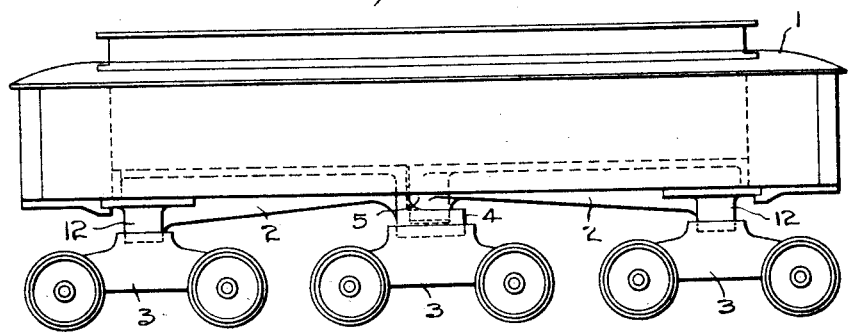
Figure 3:
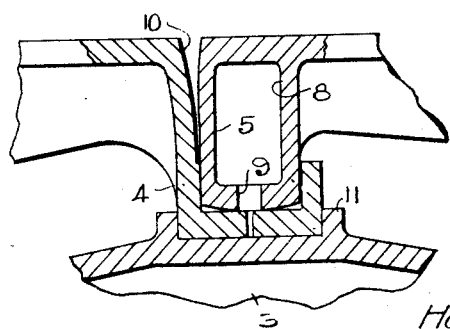

In the accompanying drawing, constituting a part hereof, and in which like reference characters designate like parts, Figure 1 is a view, in top elevation, of a railway vehicle structure embodying the principles of my invention;

Fig. 2 is a side elevational view thereof, illustrating the manner of supporting the cab structure and associating the vehicle and trucks, and Fig. 3 is an enlarged detail view, in cross-section, of the joint that cooperatively engages the ends of the main frame portions to permit relative movement thereof.

Referring to Fig. 1 of the drawing, the structure therein illustrated comprises an electric locomotive cab or body 1 for housing equipment and accessories (not shown), and an articulated supporting frame comprising a pair of similar frame portions 2 that are carried or supported by a plurality of wheel trucks 3. In the illustrated embodiment, a center truck and two end trucks are employed.

My invention resides in the articulated frame members 2 and their cooperative relation with the body 1 and the supporting trucks 3, as described in detail below.

The main or supporting frames 2 may be of the usual channel frame construction, but preferably consist of integral castings provided with cooperating pin and socket members 4 and 5, located centrally of the cab 1 and shown in detail in Fig. 3, and with projecting end lugs 6 that are adapted to engage notches 7 provided in the end structures of the cab frame proper. The portions of the frames 2 that cooperate to constitute the joint illustrated in Fig. 3 are thus meshed to provide a satisfactory and efficient joint or pivotal connection, which may be lubricated by providing an internal grease chamber 8 having a bottom opening 9 communicating with the bearing surfaces thereof. The cooperating portions may, otherwise, be formed in any suitable manner, with proper clearances and curved cooperating side walls or surfaces 10, to permit freedom of movement in the various directions in which the joint is subject to operate.

The lower portion 4 of one frame member 2 is formed to constitute a center pin for suitable engagement with the bolster 11 of the middle truck member 3, and a plurality of center pins 12 are provided near the ends of the frame members 2 for respectively engaging the longitudinally spaced end truck members 3. The functions of the vehicle frame and trucks are such that the frame portions 2 have a freedom of motion in a lateral direction being restrained by the end lugs 6 at one end and by the pivotal joint constituted by the members 4 and 5 at their other end, thus providing a motion transversely of the vehicle body. The center pin connection of the frame members 2 with the supporting trucks 3 provides movement of the truck members relative to each other and to the frame members, so that the trucks may freely follow the curvature of the rails; and, in addition thereto, the main frame of the cab will be laterally displaced, when necessary, as effectively as though the locomotive were of the articulated type.

The frame members 2 constitute an equipment deck, which offers no inconvenience or difficulty on account of the permissible movement of the frame, as the equipment is of such nature that it may be satisfactorily distributed without any rigid connections therebetween at the location of the central joint.

It is evident from the foregoing description of my invention that a railway vehicle embodying an articulated frame, such as is described herein, embodies the desirable features of an articulated locomotive without involving the detrimental effects resulting from housing the equipment and control apparatus in separate cabs, and this construction further permits the use of a minimum number of supporting trucks, inasmuch as the central truck is located at the point of articulation of the vehicle frame, which is not possible in articulated cab construction.

Although I have illustrated a certain embodiment of my invention, it will be obvious to those skilled in the art that various modifications may be made in the details of construction, such as the center pin connection of the main frame and supporting trucks and in the arrangement and relation of the several cooperating members, without departing from the principles herein set forth.

I claim as my invention:

1. In a railway vehicle, a rigid cab portion, an articulated main frame therefor constituting the equipment deck of said vehicle, and a plurality of supporting trucks, each of said trucks being pivotally connected to said frame.

2. In a railway vehicle, a rigid cab portion, an articulated main frame therefor comprising a pair of frame portions joined at their cooperating ends to permit pivotal movement, and a plurality of supporting trucks, each of said trucks being pivotally connected to said frame.

3. In a railway vehicle, a rigid cab portion, an articulated main frame therefor comprising a pair of frame portions joined at their cooperating ends to permit pivotal movement and adapted for engagement with the cab portion at the other ends thereof, and a plurality of supporting trucks, each of said trucks being pivotally connected to said frame.

4. In a railway vehicle, the combination with an articulated cab frame comprising a plurality of members, of a plurality of supporting trucks, said frame members being adapted for relative pivotal movement and each of said trucks being movable relative to said cab frame.

5. In a railway vehicle, the combination with an articulated cab frame comprising a plurality of members, of a plurality of supporting trucks, said frame members being adapted for relative pivotal movement and each of said trucks being movable relative to said cab frame and to each other.

6. In a railway vehicle, the combination with an articulated cab frame, of a plurality of supporting trucks, said frame comprising a pair of frame members cooperatively joined to provide pivotal movement centrally of said cab and each of said trucks having a center-pin-connection to said frame to provide relative pivotal movement.

7. In a railway vehicle, the combination with an articulated cab frame, of a plurality of supporting trucks, said frame comprising a pair of frame members joined to constitute a pivotal connection and a center pin for one of said truck members, and each of the other of said trucks having pivotal connections to said frame near the respective ends thereof.

8. In a railway vehicle, an articulated frame pivotally connected to permit angular movement in a transverse plane, engaging lugs on said frame cooperating with the vehicle body, center pins provided on said articulated frame, and a plurality of wheeled trucks pivotally engaged with the center pins to provide relative movement thereof.

In testimony whereof, I have hereunto subscribed my name this 28th day of September, 1925.

HAROLD A. HOUSTON.